US012682172B2

(12) United States Patent
Monteleone et al.

(10) Patent No.: US 12,682,172 B2
(45) Date of Patent: Jul. 14, 2026

(54) INTELLIGENT INTERFACE FOR AUTOMATION MULTITASKING

(71) Applicant: International Business Machines Corporation, Armonk, NY (US)

(72) Inventors: Enrico James Monteleone, San Jose, CA (US); Chandrika R, Chennai (IN); Gargi Roy, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 18/532,584

(22) Filed: Dec. 7, 2023

(65) Prior Publication Data

US 2025/0190703 A1 Jun. 12, 2025

(51) Int. Cl.
*G06F 40/30* (2020.01)

(52) U.S. Cl.
CPC .................................... *G06F 40/30* (2020.01)

(58) Field of Classification Search
CPC ...................................................... G06F 40/30
See application file for complete search history.

(56) References Cited

U.S. PATENT DOCUMENTS

| | | | |
|---|---|---|---|
| 7,505,892 B2 | 3/2009 | Foderaro | |
| 9,836,452 B2 | 12/2017 | Robichaud et al. | |
| 10,733,545 B2 | 8/2020 | Vangala et al. | |
| 11,017,765 B2 | 5/2021 | Solomon et al. | |
| 11,100,287 B2 | 8/2021 | Rabinovich et al. | |
| 11,223,583 B2 | 1/2022 | D'Agostino et al. | |
| 11,256,868 B2 | 2/2022 | Ge et al. | |
| 11,283,737 B2 | 3/2022 | Parekh et al. | |
| 11,314,944 B2 | 4/2022 | Lewis et al. | |
| 11,657,797 B2 | 5/2023 | Vishnoi et al. | |
| 11,847,565 B1 * | 12/2023 | Hao | G06N 3/045 |

(Continued)

FOREIGN PATENT DOCUMENTS

| | | | |
|---|---|---|---|
| KR | 102174922 | * | 11/2020 |
| KR | 20200128123 A | | 11/2020 |

(Continued)

OTHER PUBLICATIONS

Machine translation for KR 102174922 (Year: 2020).*

(Continued)

*Primary Examiner* — Qian Yang
(74) *Attorney, Agent, or Firm* — Tihon Poltavets

(57) ABSTRACT

Techniques for intelligently managing task automation across multiple tasks and multiple automated assistants are provided. In one aspect, an intelligent multitasking system includes: a context manager configured to use human-centric input data to determine a context of a user; an intent mapper configured to map human communication to automated task intents; and an interruption manager configured to schedule automated tasks for performance by automated assistants based on the context of the user and the automated task intents. The context manager can be hosted on a cloud having MQTT clients (e.g., IoT sensors) and an MQTT broker. The intent mapper can include a human-machine software communication interface that identifies verbal and/ or non-verbal communications. A method for intelligent multitasking is also provided.

9 Claims, 7 Drawing Sheets

700

(56) References Cited

U.S. PATENT DOCUMENTS

| | | | |
|---|---|---|---|
| 2016/0188565 A1 | 6/2016 | Robichaud et al. | |
| 2019/0334907 A1* | 10/2019 | Rodden | G06Q 10/063116 |
| 2020/0104653 A1 | 4/2020 | Solomon et al. | |
| 2020/0110623 A1 | 4/2020 | Vangala et al. | |
| 2020/0134020 A1 | 4/2020 | Rabinovich et al. | |
| 2020/0394366 A1 | 12/2020 | Miller et al. | |
| 2020/0401612 A1 | 12/2020 | Dotan-Cohen et al. | |
| 2021/0067471 A1 | 3/2021 | Taylor et al. | |
| 2021/0136018 A1 | 5/2021 | Hosseinisianaki et al. | |
| 2021/0406718 A1 | 12/2021 | Hall et al. | |
| 2022/0050922 A1 | 2/2022 | Ju et al. | |
| 2022/0066800 A1* | 3/2022 | Singh | G06F 3/0481 |
| 2022/0400092 A1 | 12/2022 | Orkin et al. | |
| 2023/0336547 A1* | 10/2023 | Damour | H04L 63/0876 |

FOREIGN PATENT DOCUMENTS

| | | | |
|---|---|---|---|
| WO | WO2021086589 A1 | | 5/2021 |
| WO | WO 2022/086765 | * | 4/2022 |
| WO | WO2022046868 A9 | | 4/2022 |

OTHER PUBLICATIONS

Microsoft—Automating business processes for T-Mobile with Power Automate—accessible at https://www.youtube.com/watch?v=KJauFM_M3o4 (Jun. 8, 2022) (1 page).

Oracle—Working with the Oracle Digital Assistant—accessible at https://www.youtube.com/watch?v=B6WKneavwkc (Jan. 14, 2021) (2 pages).

RPA Robotic Process Automation—C5: End user request to SAP using a Chatbot—accessible at https://www.youtube.com/watch?v=hXrc1yhczLs (Nov. 14, 2018) (1 page).

Front Office Automation with AARI Desktop | Digital Assistant Demo—accessible at https://www.youtube.com/watch?v=jqukRNexwdY (Nov. 30, 2020) (1 page).

Virtual Assistant—powered by Artificial Intelligence—accessible at https://www.youtube.com/watch?v=ThtetGx5ct0 (Feb. 6, 2017) (1 page).

Laiye Demo—Intelligent Digital Assistant—accessible at https://www.youtube.com/watch?v=NebWUt3ytIE (Mar. 31, 2022) (1 page).

Emotiv Headsets—accessed Dec. 6, 2023 at https://www.emotiv.com/neuroscience-based-product-innovation/ (5 pages).

Tobii Pro Spark—Enter the world of eye tracking—accessed Dec. 6, 2023 at https://www.tobii.com/products/eye-trackers/screen-based/tobii-pro-spark (5 pages).

* cited by examiner

100

302 — Create tasks

304 — Fill slots

306 — Confirm input

308 — Automate tasks

310 — Confirm task completion

300

INTELLIGENT INTERFACE FOR AUTOMATION MULTITASKING

FIELD OF THE INVENTION

The present invention relates to task automation, and more particularly, to techniques for managing task automation across multiple tasks and multiple automated assistants in order to minimize user interruption via an intelligent multitasking interface.

BACKGROUND OF THE INVENTION

An automated assistant such as a bot, a digital assistant, or a digital worker is a computer program that uses artificial intelligence to interact with and assist human users with the goal of automating tasks. For instance, an automated assistant can be employed to automate the repeated tasks associated with collecting data from the Internet, such as accessing a particular website, navigating to a particular page on that website, and retrieving a specific document, which it then provides to the human user. Doing so, advantageously frees up time for the user to work on other less routine matters.

Different applications provide their own automated assistant to perform rote tasks. Thus, performing multiple tasks (i.e., multitasking) often involves users interacting with multiple automated assistants. Further, while multitasking, more than one automated assistant may wish to talk with a user at the same time.

SUMMARY OF THE INVENTION

The present invention provides techniques for managing task automation across multiple tasks and multiple automated assistants in order to minimize user interruption via an intelligent multitasking interface. In one aspect of the invention, an intelligent multitasking system is provided. The intelligent multitasking system includes: a context manager configured to use human-centric input data to determine a context of a user; an intent mapper configured to map human communication to automated task intents; and an interruption manager configured to schedule automated tasks for performance by automated assistants based on the context of the user and the automated task intents.

In another aspect of the invention, another intelligent multitasking system is provided. The intelligent multitasking system includes: a context manager configured to use human-centric input data to determine a context of a user, where the context manager includes MQ Telemetry Transport (MQTT) clients, and an MQTT broker for receiving messages from the MQTT clients, and routing the messages to destination modules in the context manager; an intent mapper configured to map human communication to automated task intents, where the intent mapper includes a human-machine software communication interface that identifies the human communication, and where the human communication includes verbal communications, non-verbal communications, or both; and an interruption manager configured to schedule automated tasks for performance by automated assistants based on the context of the user and the automated task intents.

In yet another aspect of the invention, a method for intelligent multitasking is provided. The method includes: using human-centric input data to determine a context of a user, where the human-centric input data is selected from: human-computer interactions, software application logs, input from biometric sensors, machine learning, and combinations thereof; mapping human communication to automated task intents, where the human communication includes verbal communications, non-verbal communications, or both, and where a mode of the human communication is selected from: text, voice, gesture, and combinations thereof; and scheduling automated tasks for performance by automated assistants based on the context of the user and the automated task intents.

A more complete understanding of the present invention, as well as further features and advantages of the present invention, will be obtained by reference to the following detailed description and drawings.

DETAILED DESCRIPTION OF PREFERRED EMBODIMENTS

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
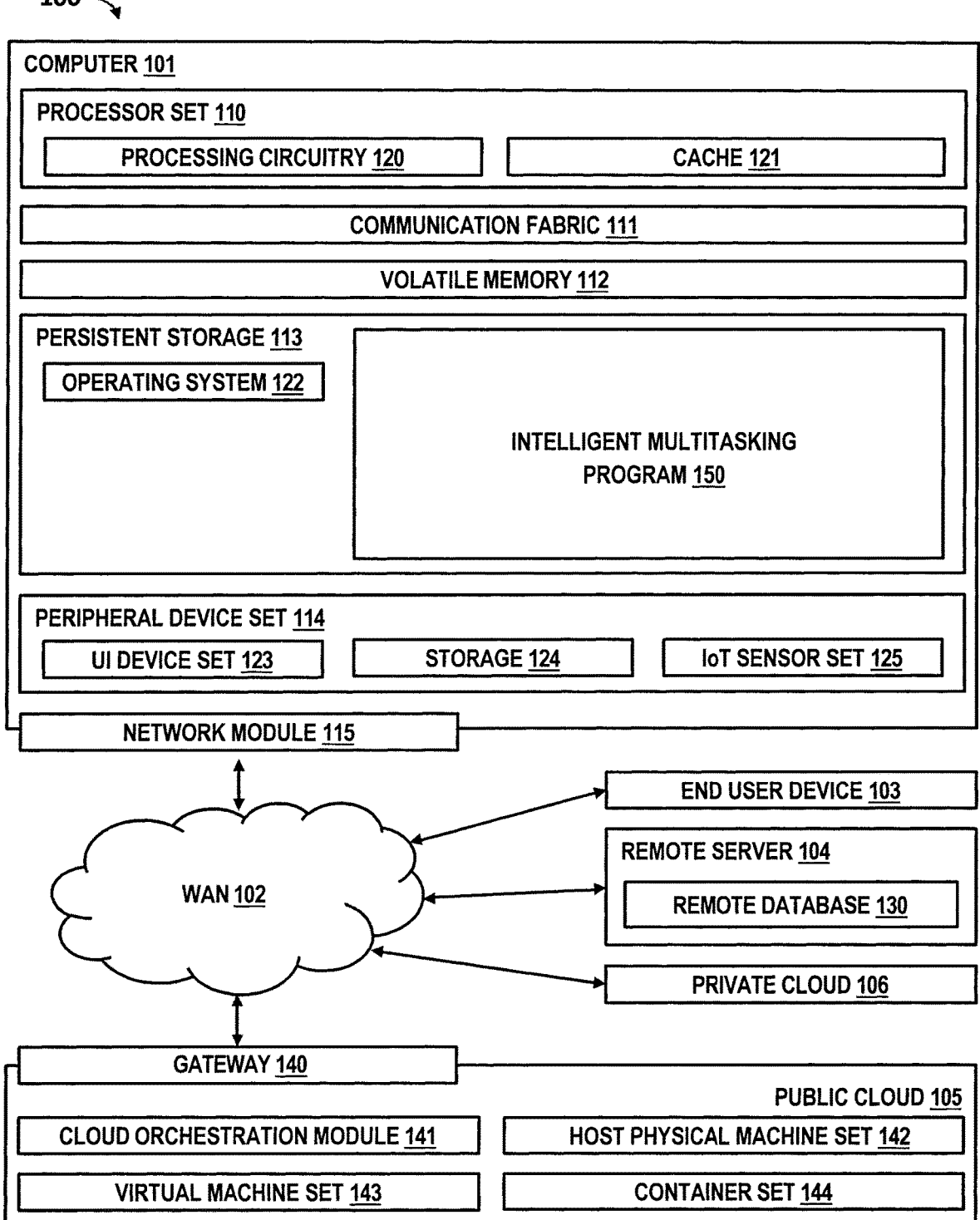
FIG. 1 is a diagram illustrating an exemplary computing environment according to an embodiment of the present invention.

Referring to FIG. 1, computing environment 100 contains an example of an environment for the execution of at least some of the computer code involved in performing the inventive methods, such as multitasking program 150. In addition to program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in program 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As highlighted above, an automated assistant such as a bot, a digital assistant, or a digital worker can help users with their daily workflow by automating repetitive tasks. However, with the proliferation of automated assistants for all sorts of tasks, multitasking can lead to the user having to interact with multiple automated assistants, often at the same time. This automated assistant overload can undesirably lead to interruptions at inopportune times which, in the end, can waste more time than it saves.

Advantageously, the present techniques provide an intelligent multitasking interface that leverages multimodal input from users to gauge when it is best (i.e., least interruptive) for them to interact with automated assistants, and schedules these interactions accordingly. The goal is to minimize user interruptions and acquire input from the user in a more efficient, intelligent manner. Namely, as will be described in detail below, the present techniques leverage human factors to define a novel, human-centric approach to human-machine communication in order to minimize interruptions and maximize time savings by addressing the challenge of managing multiple automated assistants.

The term 'automated assistant' refers generally herein to a bot, a digital assistant, a digital worker, or any technology designed to interact with and assist a human user with the goal of automating tasks. The above-referenced 'human factors' pertain to an applied field of study that examines human abilities, limitations, behaviors and processes, in order to inform human-centric designs. The present multitasking interface is representative of a 'human-machine interface' that is a device through which a human user (i.e., an operator) interacts with a control system. For instance, a human-machine interface may be an individual and control device, or the graphic screen of a computer control system. A human-machine interface may also be referred to herein as an 'operator interface.'

Figure 2:
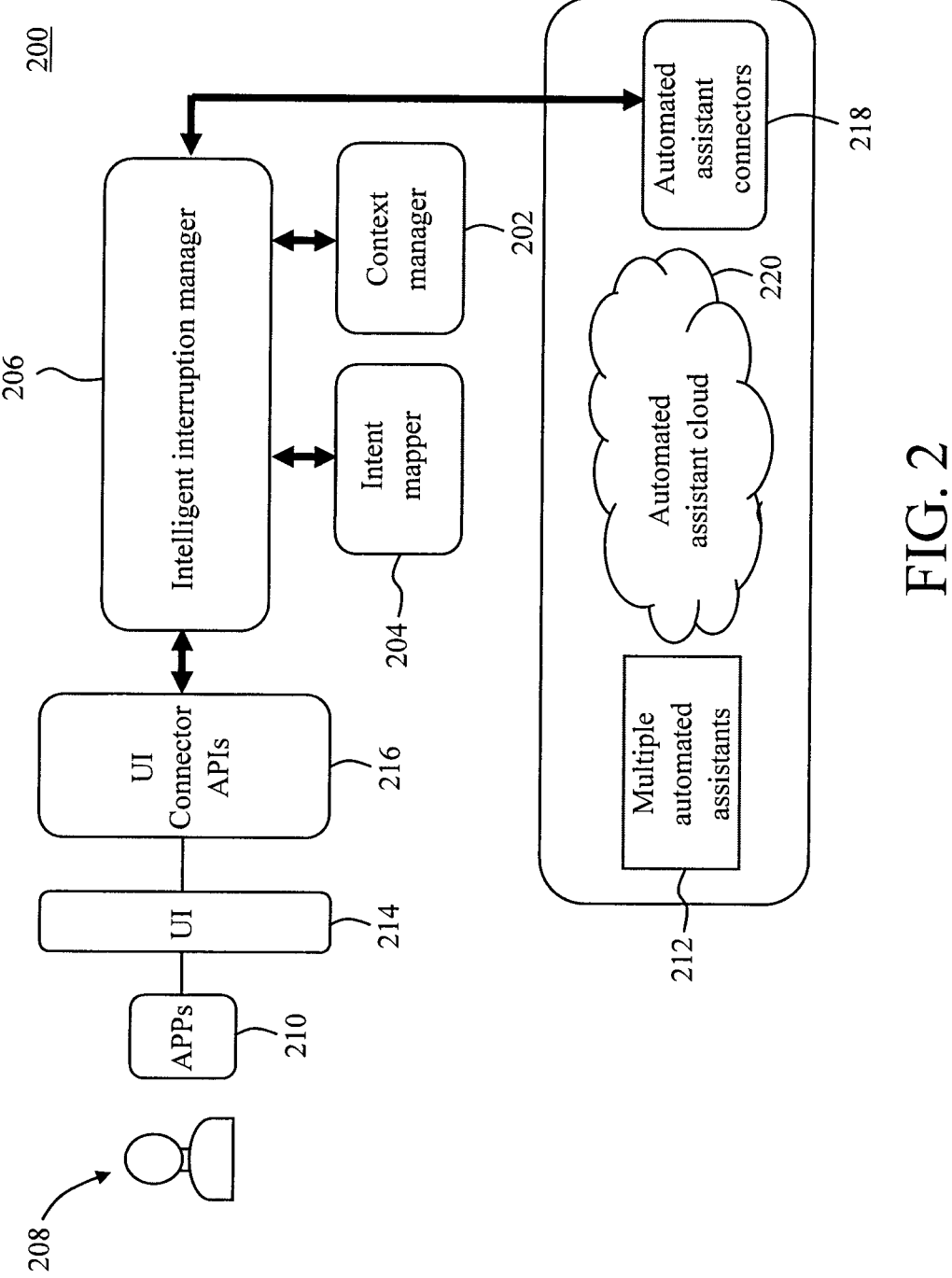
FIG. 2 is a diagram illustrating an exemplary intelligent multitasking system having a context manager, an intent mapper and an intelligent interruption manager according to an embodiment of the present invention.

FIG. 2 is a diagram illustrating an exemplary intelligent multitasking system 200 in accordance with the present techniques. According to an exemplary embodiment, intelligent multitasking system 200 is configured to execute program 150. As shown in FIG. 2, system 200 includes a context manager 202 and an intent mapper 204 that work in concert with an intelligent interruption manager or simply 'interruption manager 206' to determine activities of the (human) user including what the user is currently doing (i.e., user context), to determine an intent of the user who wants to do something by interacting with the automated assistant, and to prioritize and schedule these automated tasks accordingly. Notably, as will be described in detail below, system 200 can be configured to garner the intent of the user from both verbal and non-verbal cues such as user utterances (e.g., short phrases and key words spoken or typed) and non-verbal gestures.

For instance, referring to FIG. 2, a user 208 using applications (or Apps 210 for short) on their computer or other computing device can potentially become inundated with multiple automated assistants 212 popping up on their screens (see user interface or UI 214) at the same time. As highlighted above, these interruptions (sometimes over multiple tasks) can actually waste more time for the user 208 than they save.

However, instead of providing direct, unregulated access to the user 208, the present system 200 advantageously places the interruption manager 206 (which is accessed via UI connector application programming interface or API 216 for short) between the user 208 and the automated assistants 212. The interruption manager 206 will schedule and prioritize the tasks of the automated assistants 212 based on data it obtains from the context manager 202 and the intent mapper 204. The context manager 202 will tell the interruption manager 206 what the user 208 is currently doing and their status. For instance, is the user 208 on a break, or is the user 208 typing slowly because it is near the end of the day? Thus, the present techniques take into account human factors, and look at what the (human) user 208 does in order to make task scheduling decisions. For instance, as will be described in detail below, system 200 can leverage sensors like a presence sensor, heart rate monitor, etc. to obtain human-centric information such as whether the user 208 is currently physically present in their seat and ready to interact with the next automated assistant 212 on the schedule.

As will be described in detail below, the intent mapper 204 maps input data to a certain intent of the user 208. According to an exemplary embodiment, the input data can include verbal and/or non-verbal (e.g., typed) short phrases and/or keywords, or gestures captured via sensors. Thus, for example, the user can indicate to system 200 that is okay to start one of the automated tasks simply by a nod of the head.

Thus, in essence, the interruption manager 206 serves as the gatekeeper to user 208, and prevents the user 208 from becoming inundated with requests from the automated assistants 212. By taking human factors into account, system 200 notably goes beyond looking simply at what processes the machine is performing to intelligently sync with activity from a human perspective. Doing so, advantageously minimizes interruptions in a more meaningful, human-centric way. The system 200 can then learn when is the best time for the user 208 to be interrupted.

Using short phrases and keywords, or even gestures to infer the intent of the user 208 advantageously makes interactions with system 200 more efficient. Namely, the most important factor is to easily and effectively convey the intent of the user 208 to system 200. As such, it is not necessary to require an extensive and lengthy typed command to manage automated tasks. For instance, a single keystroke 'y' or a nod of the head should suffice. In that case, intent mapper 204 can map both of these user inputs to the intent of user 208 to initiate an automated task.

As shown in FIG. 2, based on these factors interruption manager 206 then acts as an interface between the user 208 and the automated assistants 212. Namely, according to an exemplary embodiment, interruption manager 206 interacts with the automated assistants 212 from a cloud-type economy 220 (i.e., many automated assistants 212 performing many automated tasks) using automated assistant connectors 218. As a type of application programming interface, the automated assistant connectors 218 will access specific automated assistants 212, and orchestrate task creation and automation through to task completion.

Figure 3:
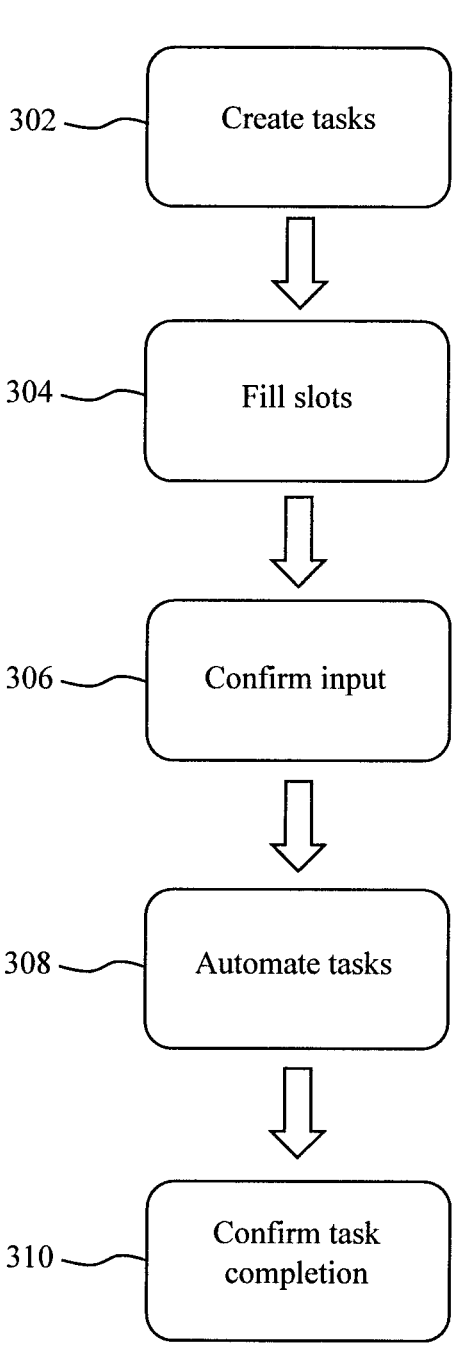
FIG. 3 is a diagram illustrating an exemplary methodology by which the intelligent interruption manager coordinates the automation of tasks performed by multiple automated assistants according to an embodiment of the present invention.

For instance, FIG. 3 illustrates an exemplary methodology 300 by which the interruption manager 206, via the automated assistant connectors 218, coordinates the automation of tasks performed by the automated assistants 212. For instance, in step 302 the interruption manager 206 creates tasks that are to be performed by the automated assistants 212. In step 304, slots in a queue are filled with the tasks created in step 302. As such, the queue is essentially a list of tasks that are to be performed in a particular order, and that order can be changed based on priority.

Prior to initiating a task, in step 306 the interruption manager 206 confirms the user input it receives via the context manager 202 and intent mapper 204, as described above. For instance, if the next task in the queue will require receiving input from the user 208, but the user 208 is not currently physically present in their seat, then the task can be rescheduled. As another example, if the task involves generating a report, the interruption manager 206 can confirm via a short phrase, keystroke or gesture from the user that they wish to proceed with task, at that time. Upon confirming the user input, in step 308 the interruption manager 206 automates the tasks accordingly. As each of the tasks are completed, in step 310 the interruption manager 206 confirms their completion and (optionally) reports this status to the user 208.

Figure 4:
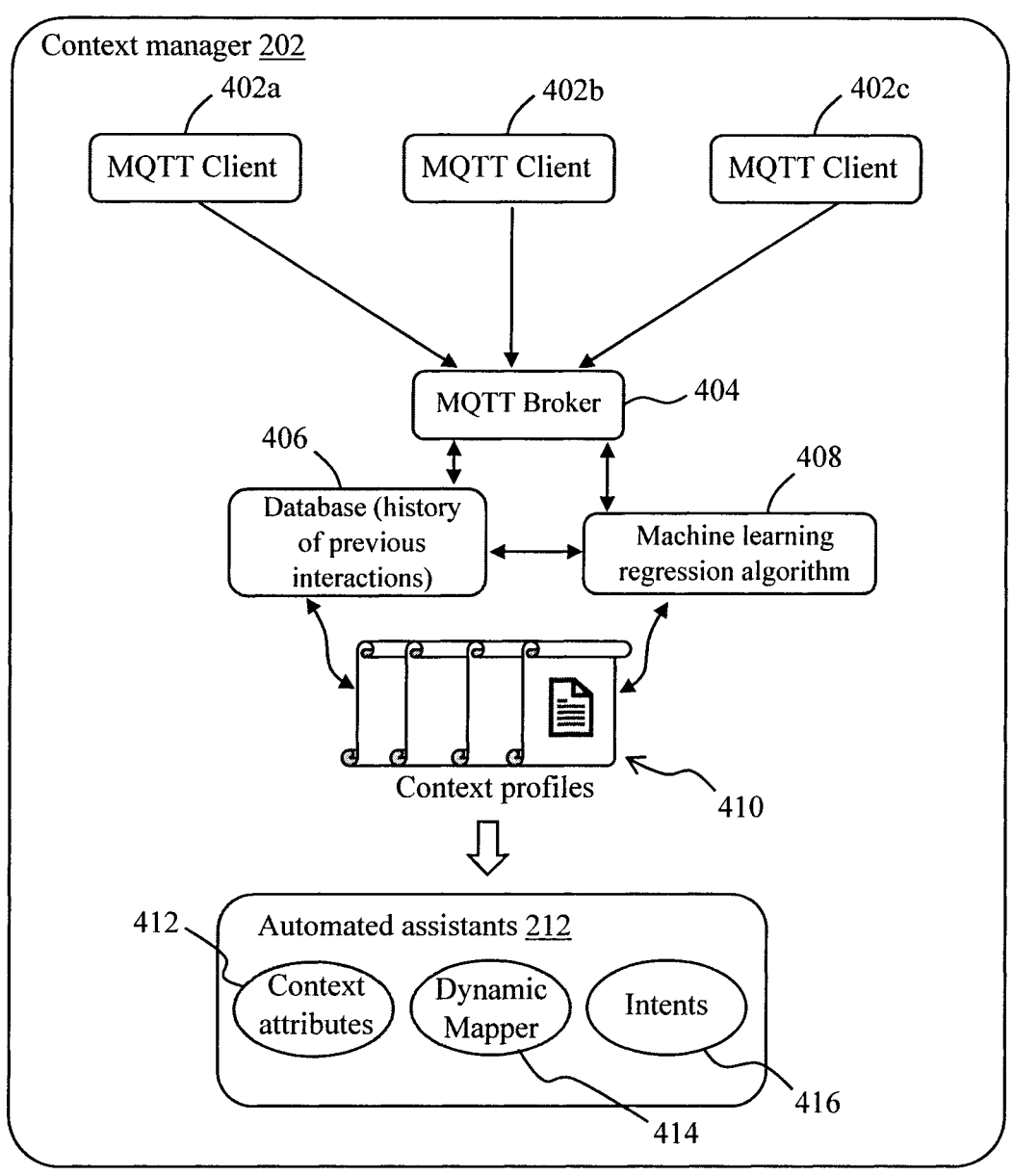
FIG. 4 is a diagram illustrating an exemplary configuration of the context manager according to an embodiment of the present invention.

Given the above overview, an exemplary configuration of the context manager 202 is shown in FIG. 4. As will be described in detail below, the context manager 202 uses human-centric input data such as human-computer interactions, software application logs (such as the login times of users based on their individual calendars), input from Internet of Things (or IoT) biometric sensors and/or machine learning to analyze human activity and human behavioral patterns to create and maintain dynamic 'human context profiles' or simply 'context profiles' which take into account multiple factors including, but not limited to, day of the week, date, time, scheduled events, break time, free time, recurring events, deadlines, past behaviors and/or biometric data. This data is then used by the interruption manager 206 to schedule and prioritize interactions with the automated assistants 212.

According to an exemplary embodiment, the context manager 202 is hosted on a cloud which includes MQ Telemetry Transport (MQTT) clients 402a, 402b, 402c, etc. and an MQTT broker 404, a database 406 of previous human-computer interactions, and a modified machine learning regression algorithm 408. MQTT is a publish and subscribe messaging transport protocol that is designed for the efficient exchange of real-time data between two types of entities in a network: a number of MQTT clients 402a, 402b, 402c, etc. (such as IoT sensors installed, e.g., on the personal computer, laptop and/or workstation of the user 208) and an MQTT (message) broker 404. In one embodiment, the MQTT broker 404 is a server that receives all messages from the MQTT clients 402a, 402b, 402c, etc. and then routes those messages to relevant destination modules in the context manager 202 such as the database 406 and modified machine learning regression algorithm 408.

Namely, the MQTT broker 404 is a multi-node, flow-based programming tool for wiring together the MQTT clients 402a, 402b, 402c, etc. (in this case IoT sensors). Whether it be an input, output or processing node, each node in the flow performs a unique and specific task. For instance, in one exemplary embodiment, the MQTT broker 404 has nodes to work with the database 406 which supports structured query language or SQL (relational) server querying, a set of nodes which offer machine learning functionalities, as well MQTT client and server nodes. Further, incorporating modified machine learning regression algorithm 408 advantageously enables the IoT sensors to learn from their environment.

According to an exemplary embodiment, the MQTT clients 402a, 402b, 402c, etc. include software and/or hardware IoT sensors and, as highlighted above, are part of the computing device (e.g., personal computer, laptop and/or workstation) of the user 208. These software and/or hardware IoT sensors connect to the MQTT broker 404, and can subscribe to any message 'topic' in the MQTT broker 404. The IoT sensors then publish messages under a topic by sending the message and topic to the MQTT broker 404. The MQTT broker 404 then forwards the message to all modules in the context manager 202 that subscribe to that topic. By way of example only, the IoT sensors can capture biometric sensory input data such as images, heart rate, blood pressure, temperature, humidity, location and/or schedules, and so on.

The context manager 202 takes this current biometric sensory input data from the IoT sensors (MQTT clients 402a, 402b, 402c, etc.) and those from previous interaction with the user 208 stored in the database 406, and uses that data to define 'human context profiles' or simply 'context profiles' 410 for personalization. For instance, by way of example only, context profiles 410 can be defined that are specific to a technical support agent or a human resources employee. Each context profile provides an analysis baseline for a daily human schedule. Additional context attributes and exceptions can be added to the context profiles 410, as the context manager 202 learns about specific users.

For instance, the modified machine learning regression algorithm 408 leverages the IoT sensor and database 406 data as context attributes 412 to personalize the context profiles of users using, e.g., pattern recognition. Regression is a machine learning technique where predictions are made as a continuous numerical value. For instance, the machine learning regression algorithm 408 can train the context manager 202 about the login times of different users based on their individual calendars, about important periods such as quarterly meeting days when no extra internal notifications should be made and which differ for different users, etc. This data forms the context attributes 412 that help personalize the context profiles 410 of the users, using machine learning pattern recognition algorithms. The context manager 202 learns when the high priority meetings are, such as when an important meeting is scheduled, and only sends very high priority tasks that the user 208 needs to attend to. The context profiles 410 for users are then updated accordingly. As shown in FIG. 4, the automated assistants 212 use the context attributes 412, dynamic mapper 414, and (user) intents 416 to understand the corresponding context profile 410 and sends a response to the user 208 for their query or to the interruption manager 206.

Figure 5:
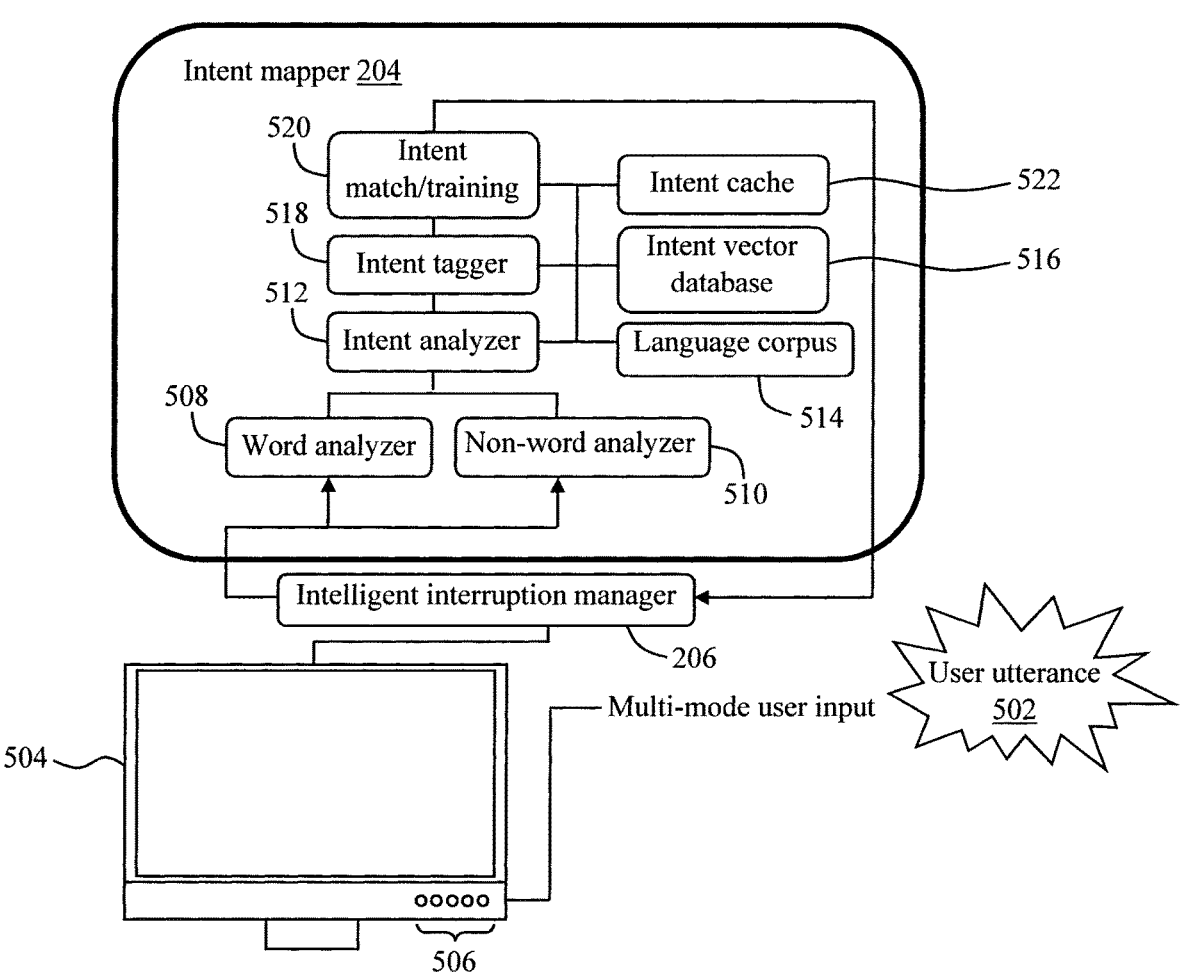
FIG. 5 is a diagram illustrating an exemplary configuration of the intent mapper according to an embodiment of the present invention.

An exemplary configuration of the intent mapper 204 is shown in FIG. 5. Generally, the intent mapper 204 is a human-machine software communication interface that identifies human verbal and non-verbal communication including, but not limited to, grammatically simplified language, words, phrases, gestures, and eye tracking, and maps the communication to automation task intents. The term 'automation task intents' as used herein refers to the intent of the user 208 with regard to the various automated tasks being performed by the automated assistants 212. For instance, the user 208 might signal with the keystroke 'y' or a nodding gesture their intent to have an automated assistant 212 produce a monthly report.

The notion here is that, for mundane tasks, humans do not interact with formal language. Instead, people tend to use short phrases and keywords, that may evolve over time. Advantageously, using the concepts of 'multi-mode communication,' the intent mapper 204 learns automation assistant task commands and maps them to multiple input modes of communication, such as text chat, speech, voice keyword, gestures, etc. based on past conversations that can change over time. Thus, the goal is not to provide full, formal, human natural language understanding, but rather to improve the human-machine interface speed and time savings.

When the user 208 wants to automate an action, instead of needing an entire conversation with an automated assistant 212, a minimal utterance or gesture can be sufficient to trigger the desired automation. For instance, referring to FIG. 5, the user provides input (see user utterance 502) by multi-mode means such as typing (on a keyboard), speaking (into a microphone), or via another off-the-shelf input device, such as an eye tracking device connected to the computing device 504 (e.g., personal computer, laptop and/or workstation) of the user 208. For instance, by way of example only, the user may utter the short phrase "run the report monthly." Thus, the modes of communication and user input can be text, voice, and/or gestures, which can be mapped to positive or negative intent (see below).

As shown in FIG. 5, this multi-mode user input is provided to the intent mapper 204 via the interruption manager 206. As also shown in FIG. 5, the computing device 504 of the user 208 can have a plurality of IoT sensors 506 associated therewith, including the above-referenced biometric sensors used by the context manager 202 to collect the human-centric, biometric sensory input data, as well as the communication input and output devices, such as microphones, speakers, and/or motion tracking devices used by the intent mapper 204. One or more of the IoT sensors 506 can be part of the IoT sensor set 125 mentioned above, or wholly separate therefrom.

A word analyzer 508 and a non-word analyzer 510 are then used to process the multi-mode user input when it is verbal and non-verbal communication, respectively. According to an exemplary embodiment, the word analyzer 508 and the non-word analyzer 510 normalize the multi-mode input for analysis by converting all input utterances (verbal and non-verbal communication) into vector representations (referred to hereinafter as 'utterance vectors'). Text input is then directly analyzed. Whereas, speech and/or voice utterances are converted to text using an artificial intelligence (AI) speech-to-text service. Further, other input devices can be trained to map other physical inputs to text representations. In one embodiment, the resulting text is then indexed, and keywords weighted using term frequency-inverse document frequency vector space model. Term frequency-inverse document frequency or TF-IDF is a statistical method used in natural language processing to determine the importance of a term within a document relative to a corpus of documents.

An intent analyzer 512 then compares these vector representations against a human language corpus or simply 'language corpus' 514 and intent vector database 516 for matching utterance vectors. The language corpus 514 helps identify language nuances based on location or geography. Intent analyzer 512 can employ any available search and analytics engine for structured and unstructured data. Doing so will enable the intent analyzer 512 to correlate the utterance vectors from the word analyzer 508 and non-word analyzer 510 to matching utterance vectors related to a specific intent of the user 208, e.g., for an automated assistant to "run the report monthly." It is notable that this two-way communication mapping can be symmetrical or asymmetrical, for example, text-to-text, or a machine prompt using text-to-speech and a human response using a gesture, respectively. According to an exemplary embodiment, language-based intents are learned through an n-gram based language analysis, and non-verbal intents are identified through a neural network classification system.

It is often the case that different multi-mode user inputs convey the same intent. For instance, a typed "y," a spoke "yes," and an up/down head nod are all variations of human communications that convey the same affirmative intent. In that regard, intent mapper 204 has an intent tagger 518 that tags such multiple variations to one common intent. By way of example only, intent tagger 518 can employ a many-to-one or multi-mode tagging system, e.g., typed 'y" spoken "yes" head nod up down. The resulting tag map of user inputs to (positive or negative) user intent is then stored in the intent vector database 516. Tagging can be done during initial training or at runtime when multiple intents with similar weights are returned.

It is notable that language phrases and intents can change over time. Thus, language and intent changes are mapped to each other via dynamic mapping in which the recent conversation history is used to update the utterance and intent mapping. Further, the user 208 is preferably provided with an interface on computing device 504 that allows the user 208 to select the desired intent and add or select the desired tag.

An intent match/training module 520 then returns the highest probability/confidence intents for the multi-mode user input. As highlighted above, the intent match/training module 520 can also adjust training weights based on feedback from the user 208, and then update intent vector database 516 accordingly. After an initial training period, all details are not needed as the system learns user preferences. As shown in FIG. 5, the intents output from the intent match/training module 520 are then provided to the interruption manager 206 for automation task processing. Preferably, an intent cache 522 is used to cache results in order to improve performance.

Figure 6:
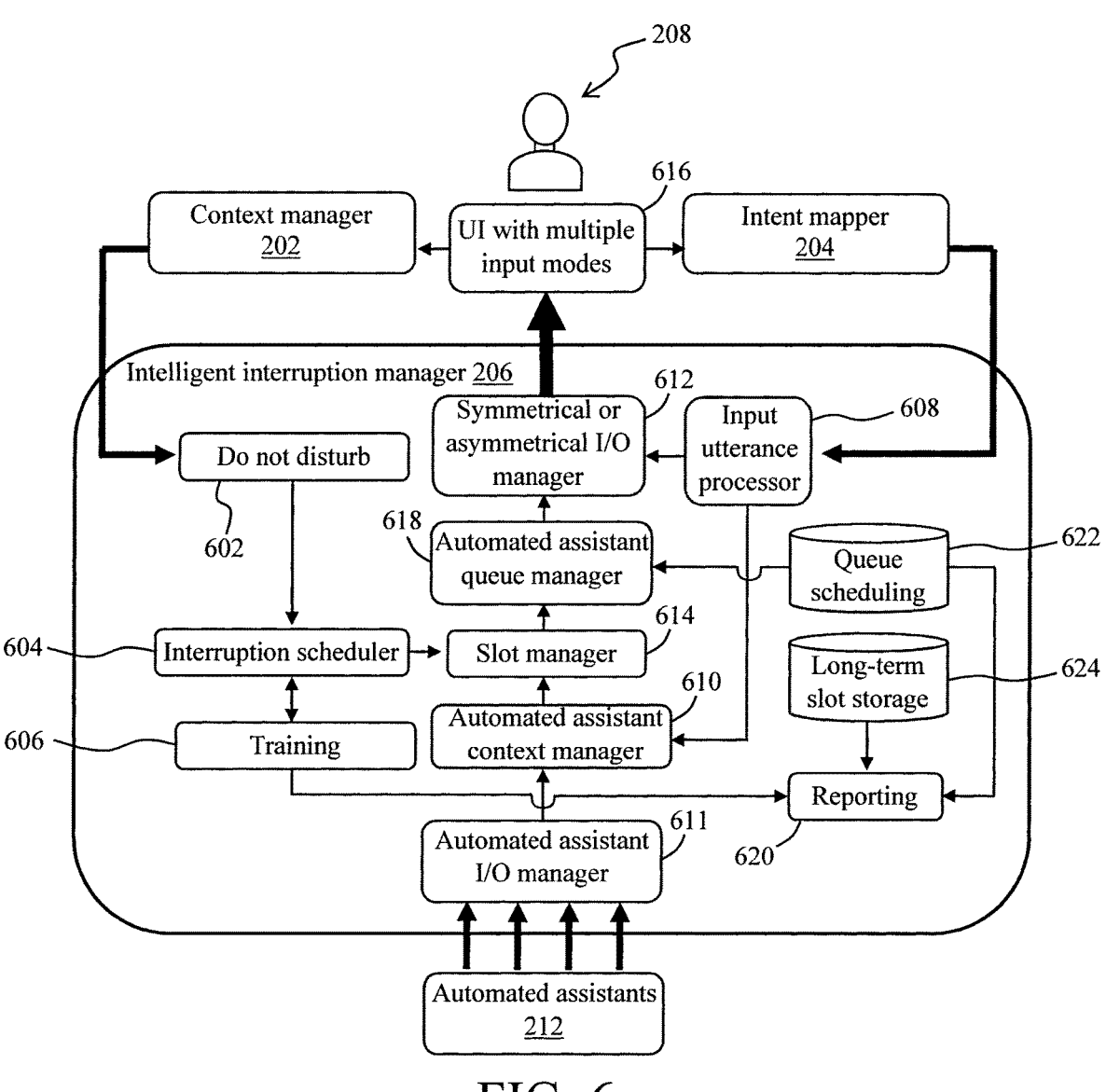
FIG. 6 is a diagram illustrating an exemplary configuration of the interruption manager according to an embodiment of the present invention.

An exemplary configuration of the interruption manager 206 is shown in FIG. 6. According to an exemplary embodiment, the interruption manager 206 is a software system that manages automation task input and output, and automated assistant queue managers that schedule and assign priorities to multiple automated assistant tasks being performed by multiple automated assistants, based on past interactions, current state, and deadlines to minimize human interruption and optimize those interactions. For instance, interrupting the user 208 for information during a break time rather than during an important meeting minimizes the disturbance caused. Also, interrupting the user 208 for information once, and only when that information is available, rather than five separate times for five different tasks optimizes the human interactions. According to an exemplary embodiment, both the quantity of interruptions and the duration of interruptions are used as input to a linear regression training model to predict and optimize interruptions. Linear regression is a supervised machine learning technique that finds a linear equation that best describes the correlation between input values and predicted output values.

As shown in FIG. 6, the interruption manager 206 receives input both from the context manager 202 and the intent mapper 204. As described in detail above, the context manager 202 uses human-centric input data (e.g., human-computer interactions, software application logs, input from biometric sensors and/or machine learning) to determine a user context (in other words, a current activity of the user 208, e.g., is the user 208 at their desk, or on a lunch break, etc.). The intent mapper 204 maps human communication (verbal and/or non-verbal, e.g., text, voice and/or gesture) to automated task intents. For instance, a typed 'y,' a spoken 'yes,' and an up/down head nod are all mapped to an affirmative intent to, e.g., have the automated assistant 212 perform the automated task.

Input from the context manager 202 enables the interruption manager 206 to account for multiple human factors to determine, via an interruption scheduler 604 which employs a continuous loop analysis, the next best time to interrupt the user 208 to request slot data. This slot data can then be stored in long-term slot storage database 624. According to an exemplary embodiment, the interruption scheduler 604 employs a scheduling algorithm that accounts for multiple human factors and may vary scheduling depending on the number of active IoT sensors. For instance, a default hourly schedule for the user 208 would allow for a natural work break, but input from the IoT sensors can be used to adjust this default schedule based on an average do not disturb 602 score. For instance, if the next interruption is scheduled (by interruption scheduler 604) for 2:00 pm on a Tuesday, but one or more of the IoT sensors is activated, then the interruption can be postponed for one hour. By way of example only, activated IoT sensors can include a calendared meeting, machine learning training for a do not disturb at 2:00 pm on Tuesday, a high heart rate, etc. Relevant training data 606 can include, for instance, user feedback flagging undesired interruptions and improved personalized scheduling.

Input utterance processor 608 obtains automated task intents from the intent mapper 204 and sends them to automated assistant context manager 610 which matches automated assistant and intent, and to symmetrical or asymmetrical input/output (I/O) manager 612 for output processing. As provided above, the present two-way communication mapping can be symmetrical or asymmetrical, for example, text-to-text, or a machine prompt using text-to-speech and a human response using a gesture, respectively. Namely, the automated assistant context manager 610 stores active automated assistant requests and matches automated task intents to particular ones of the automated assistants 212 via automated assistant I/O manager 611. For example, if the user 208 uploads a file, then automated assistant context manager 610 and slot manager 614 can match data to a time slot, or request disambiguation. Symmetrical or asymmetrical I/O manager 612 accepts the above-described multi-mode input (e.g., provided by the user 208 via their computing device having user interface (UI) 616), and sends it to the intent mapper 204.

The slot manager 614 checks the (time) slots in the schedule of the user 208 and decides/determines when (i.e., at what time slots in the schedule of the user 208) to put the automated assistants 212 in order to perform automated tasks. The interruption scheduler 604 decides whether those time slots are proper times to interrupt the user 208 based on user schedule, workload, and/or stress levels. In a preferred embodiment, slot automation task behavior is completely controlled by the user 208, using an integrated, input and output dashboard provided to the user, e.g., on UI 616. For human-to-machine communication, the user 208 can activate the dashboard at any time by a simple, user-defined click or gesture. For machine-to-human communication, interruptions are minimized by analyzing task priority, task deadlines, and the input from the context manager 202. Interaction with the user 208 is accomplished with the intent mapper 204.

The interruption scheduler 604 also has the symmetrical or asymmetrical I/O manager 612 that can change modes based on the schedule, so that the user 208 gets the notification only if it is urgent, or the workload is less. Namely, there is no need for the user 208 to change the mode manually. However, the mode can be changed manually, if desired. When a task is done, the interruption manager 206 can decide whether to interrupt the user 208 to report completion of the task to the user 208 via reporting module 620.

The interruption manager 206 tracks both short-running and long-running tasks, where automation input slot-filling can take anywhere from minutes to days. For instance, automated assistant queue manager 618 queues responses from the automated assistants 212 to be sent to the user 208 during the next scheduled interruption. The slot manager 614 stores automated assistant slot requests for long-term slot filling, e.g., in queue scheduling database 622. For example, this might be the case where an automated assistant #1 requests a document upload, but the user 208 cannot receive the document until tomorrow. The slot request remains in the slot/queue for next scheduled interruption, or whenever the user 208 provides input for automated assistant #1 context.

Figure 7:
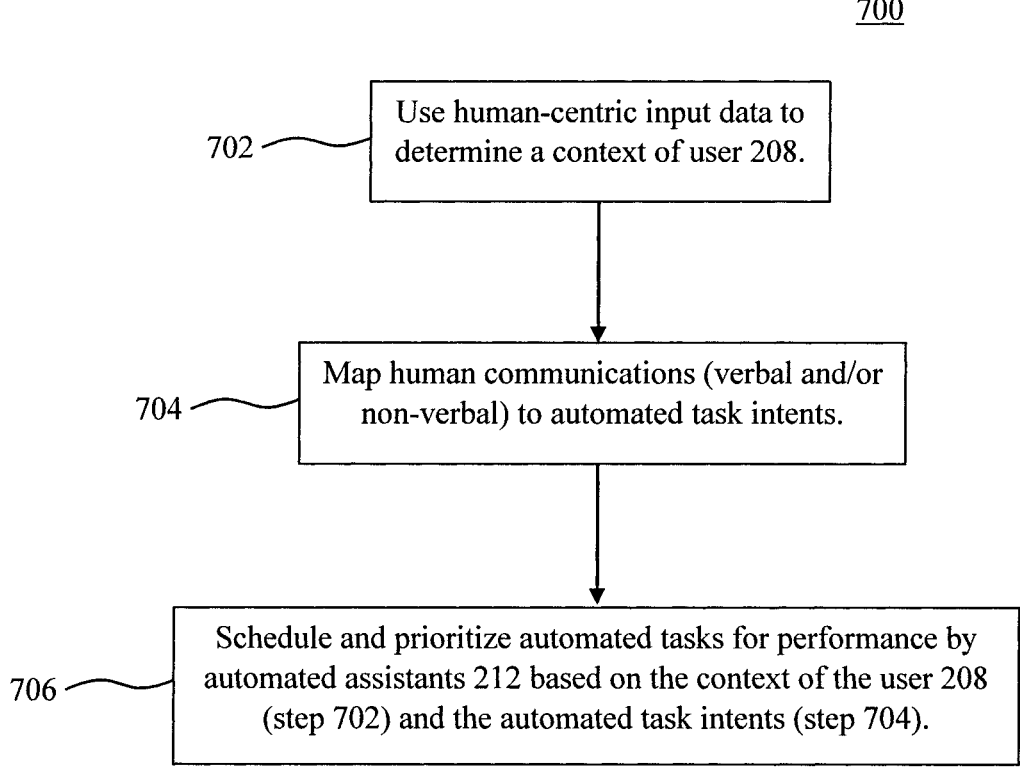
FIG. 7 is a diagram illustrating an exemplary methodology for intelligent multitasking according to an embodiment of the present invention.

FIG. 7 is a diagram illustrating an exemplary methodology 700 for intelligent multitasking using the present system 200. In step 702, the context manager 202 uses human-centric input data (e.g., human-computer interactions, software application logs, input from biometric sensors and/or machine learning) to determine a context of user 208.

In step 704, the intent mapper 204 maps human communication (i.e., verbal and/or non-verbal communications) to automated task intents. The mode of the human communication can be text, voice and/or gesture. For instance, as described in detail above, the word analyzer 508 and non-word analyzer 510 can convert verbal and non-verbal communications, respectively, into utterance vectors. The intent analyzer 512 can then correlate those utterance vectors to matching utterance vectors related to a specific intent of the user 208. The intent tagger 518 can also tag variations of the human communication that convey a same intent.

In step 706 the interruption manager 206 schedules and prioritizes automated tasks for performance by automated assistants 212 based on the context of the user (from step 702) and the automated task intents (from step 704). For instance, in the same manner as described above, the slot manager 614 can determine time slots in a schedule of the user 208 to put the automated assistants 212 in order to perform the automated tasks, and the interruption scheduler 604 can decide whether the time slots are proper times to interrupt the user 208.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for intelligent multitasking, the method comprising:

determining, utilizing human-centric input data, a current activity of a user, wherein the human-centric input data includes input from biometric sensors for the user;

mapping human communication from the user to automated task intents for automated assistants performing automated tasks, wherein the human communication includes an affirmative intent for each automated assistant from the automated assistants to perform each automated task from the automated tasks;

scheduling the automated tasks for performance by the automated assistants based on the current activity of the user and the automated task intents;

queueing a plurality of responses from the automated assistants with respect to the automated tasks; and sending, based on the input from the biometric sensors, a first response from the plurality of responses to the user, wherein the input from the biometric sensors for the user defines an interruption scheduled for the sending of the first response from the plurality of responses from the automated assistants.

2. The method of claim 1, further comprising:

converting verbal communications into utterance vectors;

converting non-verbal communications into the utterance vectors; and correlating the utterance vectors to matching utterance vectors related to a specific intent of the user.

3. The method of claim 2, further comprising:

tagging variations of the human communication that convey a same intent.

4. The method of claim 1, further comprising:

determining time slots in a schedule of the user to put the automated assistants in order to perform the automated tasks; and deciding whether the time slots are proper times to interrupt the user.

5. The method of claim 1, wherein the human-centric input data further includes human-computer interactions and software application logs.

6. The method of claim 1, wherein the human communication is selected from the group consisting of: verbal communications and non-verbal communications.

7. The method of claim 1, wherein the input from the biometric sensors for the user is selected from the group consisting of: heart rate and blood pressure.

8. The method of claim 1, further comprising:

sending, during the interruption scheduled as defined by the input from the biometric sensors, the plurality of responses from the automated assistants with respect to the automated tasks.

9. The method of claim 1, further comprising:

postponing the interruption scheduled for the plurality of responses from the automated assistants with respect to the automated tasks based on an activation of one or more of the biometric sensors.

* * * * *